Jan. 6, 1959
E. T. THEIMER
2,867,668
TERPENE ALCOHOLS AND COMPOUNDS
THEREOF, AND PROCESSES
FOR MAKING SAME
Filed Oct. 9, 1956
2 Sheets-Sheet 1
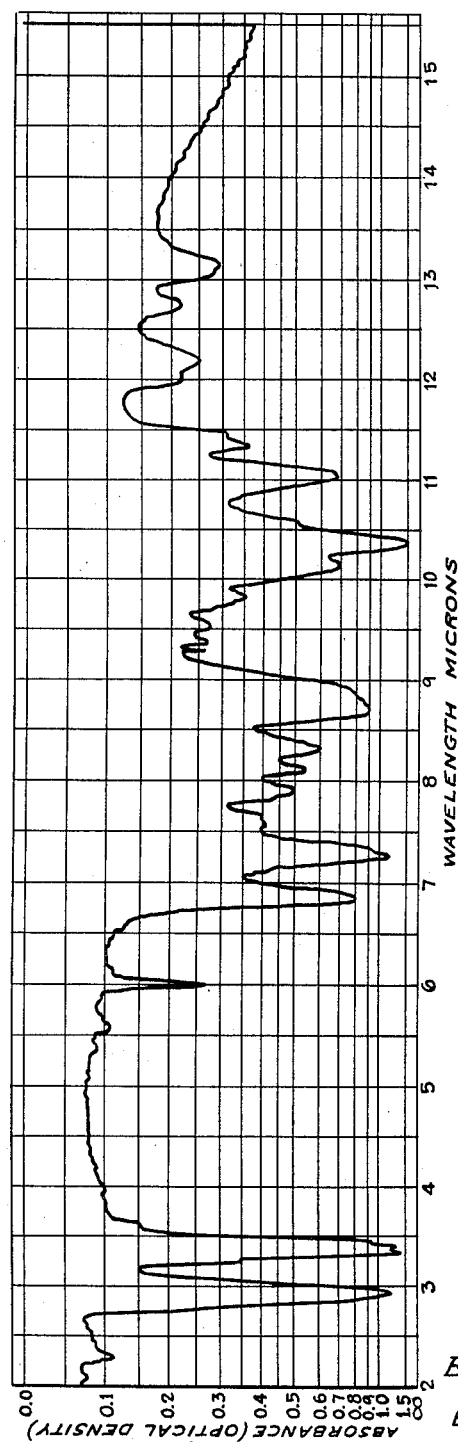
Fig. 1. (ALLO-OCIMENOL)
INVENTOR.
ERNST T. THEIMER.
BY
ATTORNEYS.

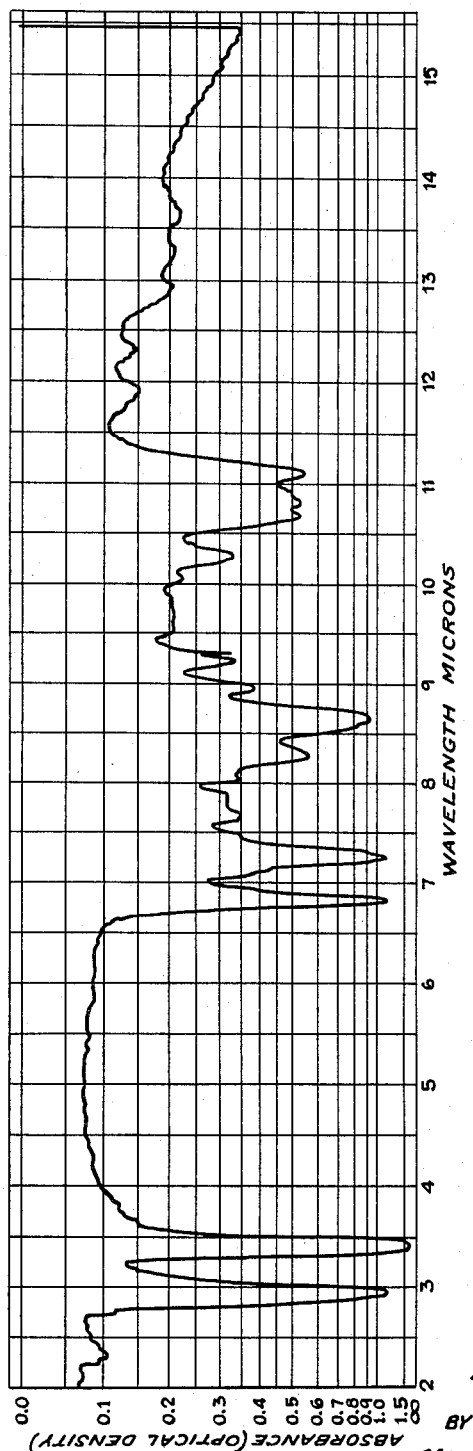

United States Patent Office 2,867,668
Patented Jan. 6, 1959

2,867,668

TERPENE ALCOHOLS AND COMPOUNDS THEREOF, AND PROCESSES FOR MAKING SAME

Ernst T. Theimer, Rumson, N. J., assignor to Van Amer-ingen-Haebler, Inc., Union Beach, N. J., a corporation of New York Application October 9, 1956, Serial No. 614,834

6 Claims. (Cl. 260—631.5)

This invention relates to terpene alcohols and derivatives thereof, and processes for producing same.

The principal object of the invention is to provide useful products of the kind described, and to provide a simple, efficient method for their production.

The invention comprises the novel products as well as the novel processes and steps of processes according to which such products are manufactured, the specific embodiments of which are described hereinafter by way of example, and in accordance with which I now prefer to practice the invention.

It has heretofore been known to hydrochlorinate terpenes, such as limonene and myrcene in a batch operation. In the case of limonene and myrcene a full mol of hydrogen chloride may be so added per mol of terpene without resin formation by polymerization. I have found that when such hydrochlorination under the same conditions is applied to allo-ocimene, nothing but a resin is obtained. Even the addition of as much as 1% of an anti-oxidizing agent such as hydroquinone, which is sometimes effective as an antipolymerizing agent, fails to prevent the polymerization of allo-ocimene under these conditions.

I have prepared in accordance with my invention a series of perfume bases. One of these has the odor of a mixture of lily of the valley and rose. It has the empirical formula $C_{10}H_{18}O$, and consists of alcohols.

These alcohols can be hydrogenated to produce saturated alcohols having the empirical formula $C_{10}H_{22}O$.

The products above mentioned are formed in accordance with my invention as follows:

Hydrogen chloride is combined with allo-ocimene in a batch operation in the proportion of up to about ½ mol of hydrogen chloride per mol of allo-ocimene. In carrying out this combination the hydrogen chloride is preferably employed in the form of an anhydrous gas diluted with an inert gas, such as nitrogen. The product formed by the combination of hydrogen chloride and allo-ocimene is then hydrolyzed with an aqueous base in the presence of a dispersing agent. It is necessary that the hydrolysis be carried out promptly, and before any substantial decomposition of the hydrochlorinated allo-ocimene occurs. I have found that such decomposition starts almost immediately after the formation of the hydrochlorinated allo-ocimene, and I prefer accordingly to carry out the process of hydrochlorination and the subsequent hydrolysis in a substantially continuous manner to avoid such decomposition.

I have also found that such hydrolysis occurs extremely slowly in the absence of an emulsifying agent. It is necessary to include an emulsifying agent in order to assure that hydrolysis with the production of the alcohols occurs, to produce commercial yields of the alcohols. The alcohols so obtained may then be hydrogenated.

As stated above, the process is preferably carried out continuously. By this continuous manner of working, the time of hydrochlorination is reduced considerably, and even up to a full mol of hydrogen chloride may be employed without polymerization. In both manners of working, however, if the hydrochlorination product is permitted to stand for a period of one half to one hour, polymerization will occur, and in fact in some experiments this polymerization took place after ten minutes following the hydrochlorination. It is thus important that the hydrochlorination product be hydrolyzed immediately.

In the continuous manner of working, when using commercially pure hydrogen chloride and technical allo-ocimene (75–80%), the temperature rises considerably at the point of contact of the two reagents and cooling is employed. There is a differential of about 70° C. between the temperature of the cooling brine and of the reaction mass. This results in the destruction of some of the allo-ocimene, so that the final yield of alcohol based on allo-ocimene is about 35 to 40% by weight.

By diluting the hydrogen chloride with an inert gas, for example nitrogen, in an amount equal in volume to the hydrogen chloride used, the intensity of the reaction can be controlled and the temperature rise is less, so that the temperature differential between the cooling liquid and the reaction mass is only about 36° C. In this case more hydrogen chloride can be added to the allo-ocimene. There is less destruction of terpene and the final yield is about 45% by weight of alcohol from the allo-ocimene used.

The second step of the reaction, namely the hydrolysis, takes place by the action of water upon the allo-ocimene hydrochloride. However, when the allo-ocimene hydrochloride is put into water, even with good stirring there is very little reaction in spite of the presence of sufficient sodium hydroxide or other base in the water to neutralize the hydrogen chloride which is liberated in the hydrolysis. It is necessary to put in an emulsifying agent, for example, a product technically known as Triton X-100, which is the tertiary octyl phenyl ether of deca ethylene glycol, or similar emulsifying agents, in an amount approximately equal to 40% of the weight of allo-ocimene hydrochloride used. With such emulsifying agents and the allo-ocimene hydrochloride, and an excess of water containing 4% sodium hydroxide, this sodium hydroxide solution being so chosen as to be in about 20% of theory excess over the amount required to neutralize all the hydrogen chloride, moderate stirring only is necessary to effect substantially complete hydrolysis to alcohol in a period of less than fifteen minutes at room temperature. In the examples below, although the reaction is substantially complete in fifteen minutes I conveniently stir overnight.

Upon steam distillation about 60% by weight based on allo-ocimene of an oil is obtained which contains about 70% of the desired allo-ocimenol.

This discovery of the use of emulsifying agents to effect the hydrolysis is particularly important with allo-ocimene hydrochloride because of the instability of this product and the need for rapid hydrolysis. If the emulsifying agent is omitted, even many days stirring with sodium hydroxide solution will not effect complete hydrolysis, and even the material which has reacted is not pure alcohol and is obtained in extremely small yield only. Attempts to solubilize the allo-ocimene hydrochloride with water by the addition of ethyl alcohol failed to give any terpene alcohol. Instead, the ethyl ether of allo-ocimenol was formed, which is a perfume having a lime-like odor.

I believe that the reaction for the production of allo-ocimenol proceeds as follows:

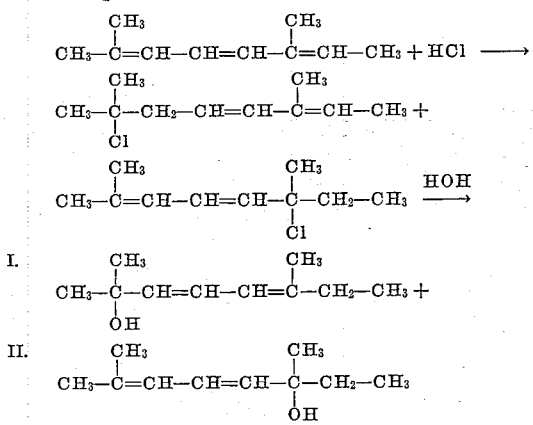

The shift of double bond is due to the resonance of a postulated carbonium ion intermediate.

The mixture of the two isomers I and II above is herein referred to as allo-ocimenol. The isomers are conjugated diolefinic tertiary alcohols having the formula

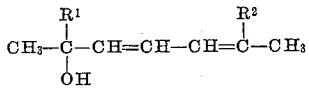

where one of the symbols $R^1$ and $R^2$ is methyl and the other is ethyl.

By hydrogenation the following product is formed:
The two isomers of allo-ocimenol$+2H_2 \rightarrow$

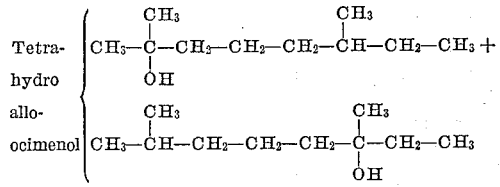

By esterification of tetrahydro ocimenol esters such as the acetate may be obtained.

The following examples of the manner in which I now prefer to produce the products of my invention. It is understood that these examples are purely illustrative, and that the invention is not to be considered as restricted thereto except as indicated in the appended claims.

The allo-ocimene used in the examples below is prepared by the pyrolysis of alpha-pinene and contains as impurities 20 to 25% of other terpenes, notably dipentene formed concurrently in the pyrolysis.

In the accompanying drawings forming part of this application the infra red spectrum is shown of compounds of my invention. In these drawings:

Fig. 1 represents an infra red spectrum of allo-ocimenol, and

Fig. 2 represents an infra red spectrum of tetrahydro allo-ocimenol.

*Allo-ocimenol*

Example 1.—2176 grams of 75% technical allo-ocimene were reacted in a continuous hydrochlorinator using 315 grams of anhydrous hydrogen chloride over a period of 210 minutes. The allo-ocimene was added at a flow rate of 10 grams per minute, and the hydrogen chloride at a rate of 1.5 grams per minute. Brine at $-20°$ C. was used as coolant. The temperature of the reactants at the point of contact was 41–43° C. The hydrochlorination product was run continuously as formed into a stirred solution of 800 grams of sodium hydroxide and 1400 grams of dispersing agent Triton X–100 (tertiary octyl phenyl ether of decaethylene glycol), in 19.2 liters of water. After complete addition of the hydrochlorination product the resulting emulsion was stirred for 20 hours at room temperature. The entire mixture was then steam-distilled, yielding 1326 grams of oil testing 70–75% as alcohol having the formula $C_{10}H_{18}O$, which on vacuum fractionation gave 419 grams of terpenes, 767 grams (35% of theory) of substantially pure alcohol, the remainder being residue and loss. Allo-ocimenol has the formula $C_{10}H_{18}O$, and has the following physical constants: $D_{15}$—0.877 and $N_{D20}$—1.4913; boiling point at 3 mm. 70° C. The ultraviolet absorption shows a maximum at 238 millimicrons; molecular extinction=23,400. The infrared spectrum is shown on the attached drawing, Fig. 1. This spectrum was made with a Model 21 Perkin-Elmer infra red spectrophotometer with sodium chloride prism at 960 resolution, 1:1 response, 4.5 gain, 3-speed, 0 suppression, in a 25 micron cell, and recorded on absorbance (optical density) paper linear with respect to wave length. It is a clear water-white oil with a combined rose and lily of the valley odor. It is soluble in 3.8 vols. of 60% aqueous ethyl alcohol. Its molecular weight is 154.14, calculated carbon 77.9%, hydrogen 11.7%; found carbon 77.17%, 77.42%, hydrogen 11.38%, 11.42%.

Example 2.—In the same manner as Example 1, 544 grams of allo-ocimene were hydrochlorinated during a period of 85 minutes, using a mixture of 170 grams of anhydrous hydrogen chloride diluted with an equal volume of dry nitrogen. The flow rate for the allo-ocimene was 6½ grams per minute, and of the hydrogen chloride, 2 grams per minute. The brine coolant temperature was $-20°$ C., and the temperature of the reactants at the point of contact $+16°$ C. The reaction product was run directly into a stirred solution of 10 liters of water containing 400 grams sodium hydroxide and 175 grams of Triton X–100. After stirring for 20 hours at room temperature the emulsion was steam-distilled, yielding 382 grams of oil testing about 85% as $C_{10}H_{18}O$ alcohol. On vacuum fractionation 234 grams (43% of theory) of substantially pure alcohol $C_{10}H_{18}O$, with the same physical constants as in Example 1 were obtained.

*Hydrogenated allo-ocimenol*

Example 3.—1,000 grams of allo-ocimenol as obtained in Example 1 are hydrogenated at 50° C. with 30 grams Raney nickel catalyst, at 50 atmospheres pressure until no further hydrogen is absorbed. In all, 2 mols of hydrogen are absorbed per mol of allo-ocimenol. After filtering off the catalyst and vacuum distilling the product there is obtained 900 grams of tetrahydro allo-ocimenol, boiling point 50° C. at 2 mm., $D_{15}$—0.8324; $N_{D20}$—1.4340, with infra red spectrum as shown in the drawing Fig. 2, where the spectrum was recorded in the same manner as in Fig. 1. The material is a perfume. It is a clear, water-white oil. It is soluble in organic solvents and is insoluble in water. The product has a molecular weight of 158.17, and is a mixture of isomers. It has the empirical formula $C_{10}H_{22}O$.

*Tetrahydro allo-ocimenyl acetate*

Example 4.—403 grams of tetrahydro allo-ocimenol obtained as described in Example 3 are combined with 285 grams acetic anhydride, 0.8 gram of phosphoric acid, and allowed to stand for 72 hours at 25–45° C. The mixture is washed neutral to litmus, and vacuum-distilled, giving 410 grams of tetrahydro allo-ocimenyl acetate boiling at 63–68° C. at 2 mm. The material on careful fractionation is separated into the following sections:

|  | Percent acetate | $D_{15}$ | $N_{D20}$ | Odor |
| --- | --- | --- | --- | --- |
| I | 90 | .8700 | 1.4258 | Perfume. |
| II | 90 | .8709 | 1.4265 | Like anise and basil. |
| III | 90 | .8736 | 1.4271 | Soft linalyl acetate. |
| IV | 88 | .8975 | 1.4356 | Like terpinyl acetate. |
| V | 82 | .9220 | 1.4458 | Disagreeable butyric odor. |

Allo-ocimenol of Examples 1 and 2 has unusual physical constants. It has $D_{15}$ of 0.877 and $N_{D20}$ of 1.4913. Of the many alcohols with empirical formula $C_{10}H_{18}O$, and which are described in the literature, all have other physical constants. Of those which have $D_{15}$ of 0.86 to 0.88, that is, in the range of this alcohol described herein, practically all have $N_{D20}$'s of 1.47, that is, substantially lower than the alcohols of Examples 1 and 2. Those with $N_{D20}$'s of 1.49, corresponding to the present alcohol, practically all have $D_{15}$ of 0.92 to 0.93, that is, substantially higher. Also, these latter alcohols are mostly cyclic.

The allo-ocimenol of my invention is not cyclic. It has not been rearranged to a cyclic structure in the reaction, but rather still contains two double bonds which is proved by hydrogenation, which shows that two mols of hydrogen are taken up by one mol of the alcohol.

The following non-ionic emulsifiers may be substituted for the emulsifier Triton X-100 in the above examples, in equivalent quantities to produce substantially the same results:

OPE-20—Eikosa ethylene glycol ether of tertiary octyl phenol (Rohm & Haas),

OPE-30—Triaconta ethylene glycol ether of tertiary octyl phenol (Rohm & Haas),

Ranex-88—polyoxy ethylene alkyl aryl ether (Atlas Powder Company), and

G-1690—polyoxy ethylene alkyl, aryl ether (Atlas Powder Company).

Other non-ionic emulsifiers which may be similarly used, and which are similarly non-sensitive to the process under the reaction conditions therein given are:

Tween-20—polyoxy ethylene sorbitan monolaurate (Atlas Powder Company), and

Tween-80—polyoxy ethylene sorbitan monooleate (Atlas Powder Company).

I claim:

1. The process which comprises combining hydrogen chloride with allo-ocimene in the proportion of not more than about 1 mol of hydrogen chloride per mol of allo-ocimene, prior to any substantial decomposition of the resulting allo-ocimene hydrochloride hydrolyzing the product formed with an aqueous base in the presence of a non ionic dispersing agent, and recovering alcohols having the empirical formula $C_{10}H_{18}O$ therefrom.

2. The process which comprises combining hydrogen chloride diluted with an inert gas with allo-ocimene in the proportion of not more than about 1 mol of hydrogen chloride per mol of allo-ocimene, prior to any substantial decomposition of the resulting allo-ocimene hydrochloride hydrolyzing the product formed with an aqueous base in the presence of a non-ionic dispersing agent, and recovering alcohols having the empirical formula $C_{10}H_{18}O$ therefrom.

3. The process which comprises continuously combining hydrogen chloride with allo-ocimene in the proportion of not more than about 1 mol of hydrogen chloride per mol of allo-ocimene and continuously hydrolyzing the product formed with an aqueous base in the presence of a non-ionic dispersing agent and recovering a mixture of alcohols having the empirical formula $C_{10}H_{18}O$.

4. The process which comprises continuously combining hydrogen chloride diluted with an equal volume of nitrogen with allo-ocimene in the proportion of not more than 1 mol of hydrogen chloride per mol of allo-ocimene, continuously hydrolyzing the hydrochloride formed with aqueous sodium hydroxide in the presence of a non-ionic dispersing agent while stirring the mixture, and recovering alcohols having the empirical formula $C_{10}H_{18}O$ therefrom.

5. The process which comprises hydrolyzing allo-ocimene hydrochloride with aqueous alkali metal hydroxide in the presence of a non-ionic dispersing agent to produce alcohols having the empirical formula $C_{10}H_{18}O$.

6. A mixture of conjugated diolefinic tertiary alcohols having $D_{15}=0.877$ and $N_{D20}=1.4913$, and having the structural formula

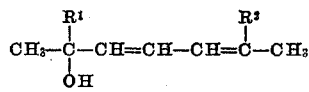

where one of the symbols $R^1$ and $R^2$ is methyl and the other is ethyl.

References Cited in the file of this patent

UNITED STATES PATENTS

| | | |
|---|---|---|
| 2,313,767 | Pollack et al. | Mar. 16, 1943 |
| 2,467,330 | Milas | Apr. 12, 1949 |
| 2,609,388 | Knapp et al. | Sept. 2, 1952 |
| 2,794,826 | Bell et al. | June 4, 1957 |

FOREIGN PATENTS

| | | |
|---|---|---|
| 298,193 | Germany | Aug. 7, 1913 |

OTHER REFERENCES

Petrov et al.: Chem. Abst., vol. 37 (1934), 1994.

Beilstein's Handbuch, vol. II, 2nd supplement, p. 146 (1943).

Nazarov et al.: Chem. Abst., vol. 43 (1949), 216a.

Lucas et al.: "Principles & Practice in Organic Chemistry," Wiley, N. Y., 1949, p. 209.

Bateman et al.: J. Chem. Soc. (London), pp. 3055-6 (1950).

Zalkind et al.: Chem. Abst., vol. 46 (1952) 1969h.